(12) United States Patent
Meyer

(10) Patent No.: US 6,510,915 B1  
(45) Date of Patent: Jan. 28, 2003

(54) MOUNTING OF A GEAR-SHIFT IN A MOTOR VEHICLE

(75) Inventor: Jörg Meyer, Wagenfeld (DE)

(73) Assignee: ZF Lemförder Metallwaren AG (DE)

(*) Notice: Subject to any disclaimer, the term of this patent is extended or adjusted under 35 U.S.C. 154(b) by 6 days.

(21) Appl. No.: 09/889,067

(22) PCT Filed: Nov. 9, 2000

(86) PCT No.: PCT/DE00/03921  
§ 371 (c)(1), (2), (4) Date: Jul. 6, 2001

(87) PCT Pub. No.: WO01/34421  
PCT Pub. Date: May 17, 2001

(30) Foreign Application Priority Data

Nov. 9, 1999 (DE) .......................................... 199 53 958

(51) Int. Cl.⁷ .............................................. B60K 20/04
(52) U.S. Cl. ................. 180/336; 74/473.15; 74/473.29; 74/473.3
(58) Field of Search ....................... 180/336; 74/473.15, 74/473.29, 473.3, 501.6

(56) References Cited

U.S. PATENT DOCUMENTS

| | | |
|---|---|---|
| 3,665,776 A | 5/1972 | Hess |
| 4,527,913 A | 7/1985 | Seifert |
| 5,106,143 A * | 4/1992 | Soeters ...................... 296/37.8 |
| 5,865,066 A | 2/1999 | Osborn et al. |
| 5,887,485 A * | 3/1999 | VanOrder et al. ........ 74/473.15 |
| 5,970,814 A | 10/1999 | Smith et al. |
| 5,992,264 A | 11/1999 | Brock, Sr. |

FOREIGN PATENT DOCUMENTS

| | | |
|---|---|---|
| DE | 195 37 899 A1 | 4/1996 |
| DE | 296 14 638 U1 | 12/1996 |
| EP | 0 704 336 A1 | 4/1996 |
| GB | 2 258 520 A | 2/1993 |

* cited by examiner

*Primary Examiner*—Peter C. English  
(74) *Attorney, Agent, or Firm*—McGlew and Tuttle, P.C.

(57) ABSTRACT

A motor vehicle is provided with a shifting device fastened stationarily in the motor vehicle for actuating the gear change box. The connection between the motor vehicle and the shifting device comprises at least one locking device in the form of a snap-in connection. The snap-in connection may be two complementary snap-in elements which detachably engage one another. The locking device is used with at least one fixing device comprising a bushing and a complementary sleeve that can be inserted into the bushing.

20 Claims, 4 Drawing Sheets

MOUNTING OF A GEAR-SHIFT IN A MOTOR VEHICLE

FIELD OF THE INVENTION

The present invention pertains to a motor vehicle with a shifting device fastened stationarily in the motor vehicle for actuating the gear change box, wherein a releasable connection is provided between the motor vehicle and the shifting device.

BACKGROUND OF THE INVENTION

System solutions are increasingly used in modem automobile manufacture, i.e., complete devices are supplied for and installed in the motor vehicle to be manufactured. Saving expensive assembly time is of particular significance.

Shifting devices for motor vehicles have hitherto been connected to the motor vehicle body by a screw connection. The assembly effort needed for this increases the manufacturing costs rather substantially. In addition, there is another problem in prior-art designs in that the housings of the shifting devices usually consist of plastic. Plastic often lacks the necessary strength in the case of a screw connection so that this either leads to an unsatisfactory quality of installation or additional expenses become necessary for reinforcing the area of the screw connection.

SUMMARY AND OBJECTS OF THE INVENTION

The basic technical object of the present invention is to provide a possibility of connection between the motor vehicle and a shifting device, which is firmly seated and optimized for tolerances while requiring a low assembly effort.

According to the invention, a motor vehicle is provided with a shifting device fastened stationarily in the motor vehicle for actuating the gear change box. The connection between the motor vehicle and the shifting device comprises at least one locking device in the form of a snap-in connection. The snap-in connection may be two complementary snap-in elements which detachably engage one another. The locking device is used with at least one fixing device, comprising a bushing and a complementary sleeve that can be inserted into the bushing.

It is thus proposed that the connection between the motor vehicle and the shifting device for actuating the gear change box be equipped with at least one locking device in the form of a snap-in connection each. The snap-in connection may in turn have two complementary snap-in elements which detachably engage one another. Another possible solution to the technical problem mentioned in the introduction is seen in the connection comprising a locking device and at least one fixing device for positioning the shifting device in the correct position. Each fixing device may be composed of a bushing and a complementary sleeve that can be inserted into the bushing.

Corresponding to another embodiment of the present invention, the first snap-in element may be a ramp that is wedge-shaped when viewed in cross section and the second snap-in element may be a strap consisting of a material that is spring-elastically deformable in at least some areas.

As was described in the introduction, shifting devices usually have a housing consisting of plastic. The different elements can be made in one piece during the manufacture of this housing in one operation in a simple manner and at low cost. Thus, it is meaningful to make, e.g., the strap directly in one piece with the housing during the manufacture of the housing.

This strap may have approximately an L shape when viewed in cross section and the area consisting of the spring-elastically deformable material passes over into a reinforced grip area which extends at right angles to the first area and has a snap-in surface associated with the first snap-in element.

A damping element, which has a vibration-insulating effect, may be provided at this snap-in surface.

However, the strap may also be designed as a strap that can be displaced into the housing, which prevents the one-part design. A spring force-tensioned design is meant here, where the strap supports at the same time the supporting effect on the ramp.

If a plurality of locking devices are provided at the shifting device, these may be used at the same time for positioning in the form of a fixing device.

According to an advantageous embodiment of the present invention, a locking device and a plurality of fixing devices are used at the shifting device of the motor vehicle according to the present invention.

The bushing of each fixing device may be designed as a bushing with limited elasticity and, furthermore, have approximately a U shape or a V shape when viewed in cross section.

In a simple design, the sleeve as a whole is manufactured from an elastomer material or rubber or the sleeve is provided at least with an elastomer or rubber coating.

As a result, tolerance compensation and vibration insulation are achieved in a simple manner. In addition, assembly can be facilitated.

One exemplary embodiment of the present invention will be explained in greater detail below with reference to the drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
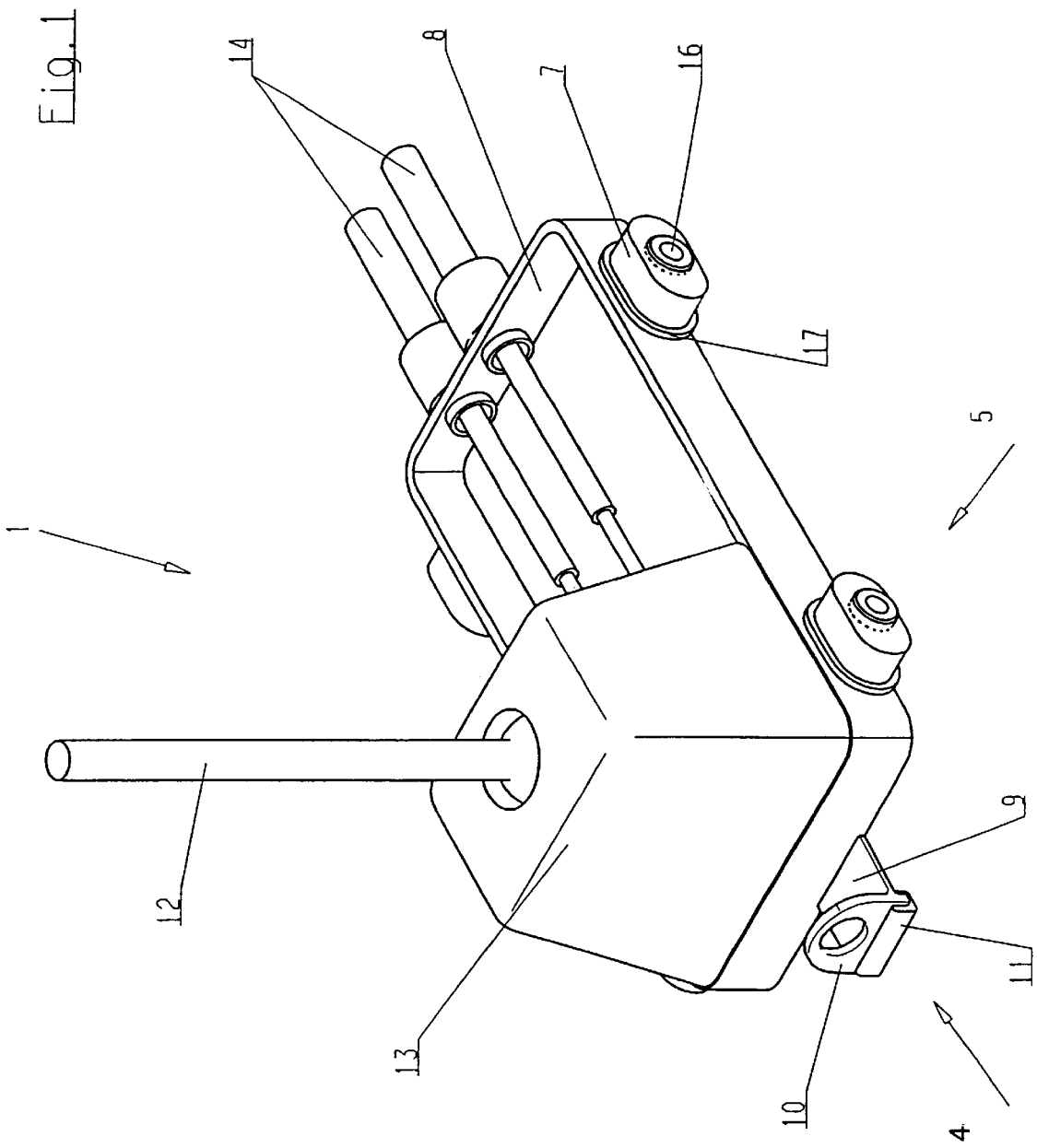
FIG. 1 is a three-dimensional view of a shifting device for installation in a motor vehicle according to the present invention.
Figure 2:
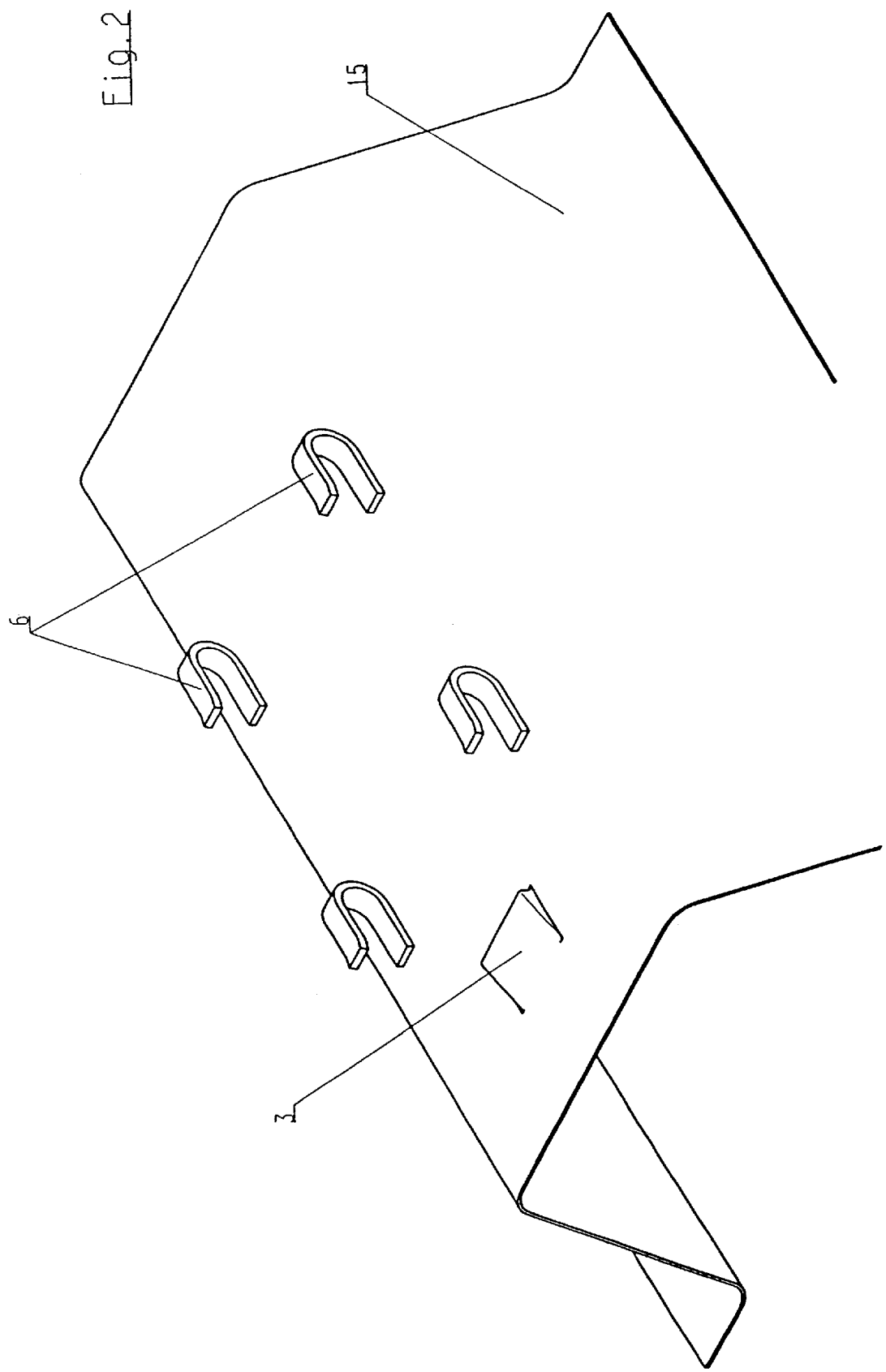
FIG. 2 is a tunnel of a motor vehicle according to the present invention.

Referring to the drawings in particular, the figures show as an example a motor vehicle according to the present invention with a shifting device, which is stationarily fastened in the motor vehicle and is designated as a whole by 1 and is used to actuate the gear change box. This shifting device contains a selector lever 12, which is mounted movably in a dome 13 of the housing 8 in the known manner. Bowden cables 14 are used to transmit the selection and shifting movements.

The shifting device is arranged in the motor vehicle by means of a multipart connection. The connection is composed in the exemplary embodiment of a locking device 2 and four fixing devices 5, wherein the locking device 2 comprises a snap-in connection with two complementary snap-in elements 3, 4, which detachably engage one another, and the fixing devices 5 each have a bushing 6 and a complementary sleeve 7 that can be inserted into the bushing 6. The first snap-in element 3 is a ramp which is wedge-shaped when viewed in cross section. The second snap-in element is a strap 4, which consists of a material that is spring-elastically deformable in at least some areas and is made in one piece with the housing 8 consisting of plastic.

Figure 3:
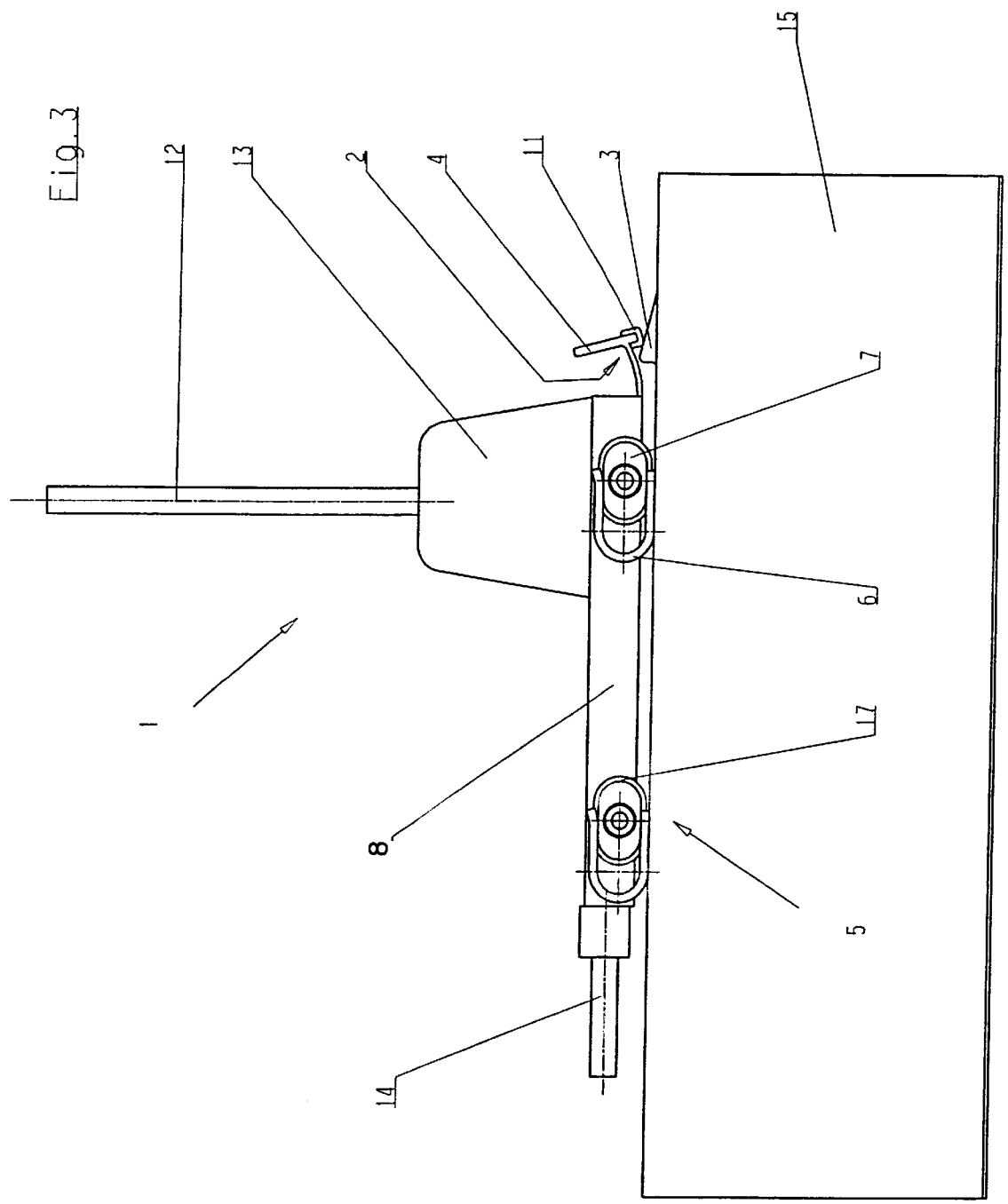
FIG. 3 is a side view of a shifting device of a motor vehicle according to the present invention.
Figure 4:
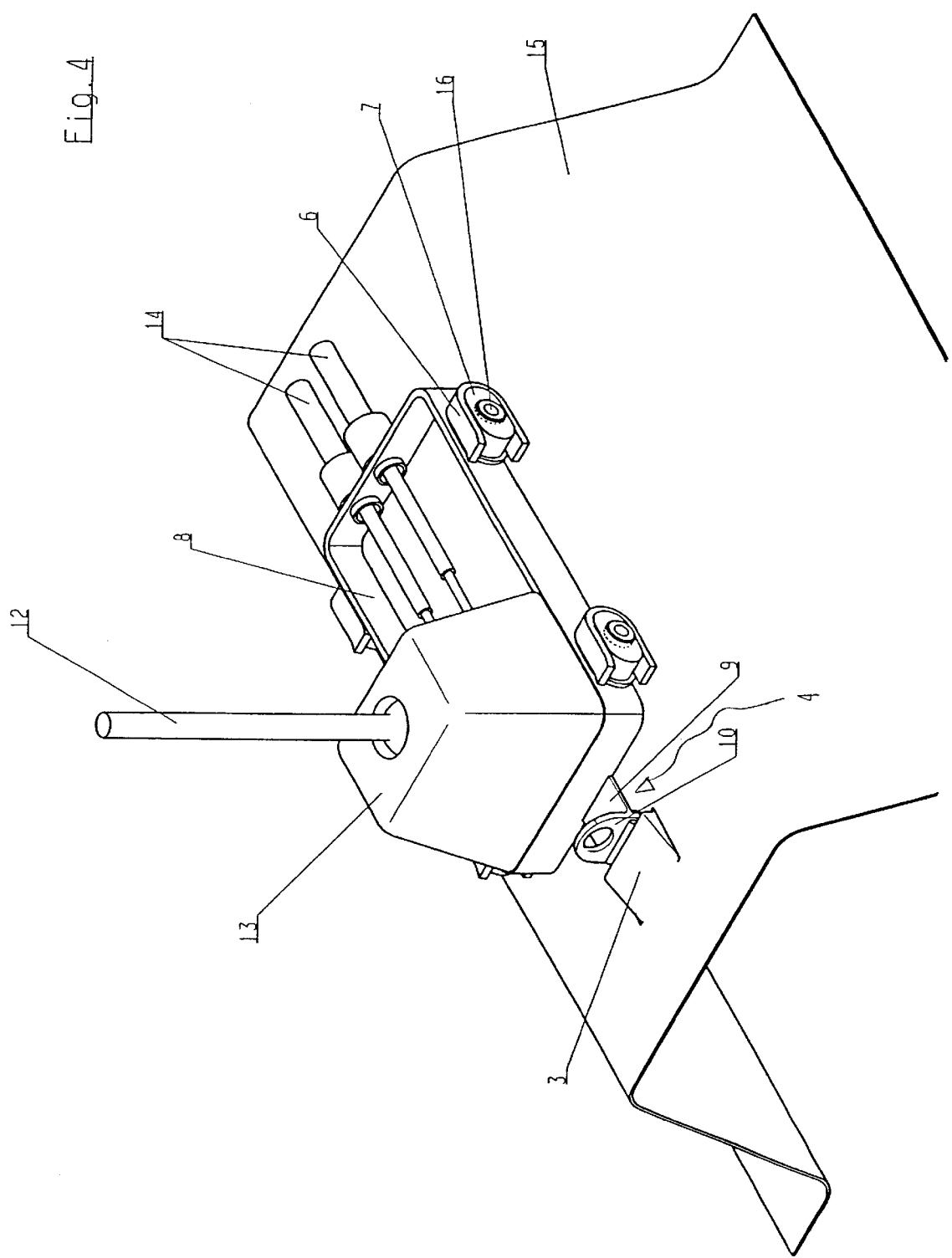
FIG. 4 is a three-dimensional view of the connection of a shifting device to the tunnel of a motor vehicle according to the present invention.

The strap 4 is approximately L-shaped when viewed in cross section, wherein the lower, approximately horizontal area 9 consists of a spring-elastically deformable material and passes over into a reinforced grip area 10. The grip area 10 extends at right angles to the first area 9 and has a snap-in surface associated with the first snap-in element 3. This snap-in surface is provided in this case with a damping element 11 (see FIG. 3). The damping element 11 is supported against the ramp 3.

The bushings 6 of the fixing device 5, which have a limited elasticity, are approximately U-shaped when viewed in cross section and are fastened on the tunnel 15 of the motor vehicle. The sleeves 7 arranged on the housing 8 of the shifting device 1 consist of rubber and are fastened to the housing 8 by means of a rivet 16. For better contact and to facilitate the assembly of the sleeves 7, a support 17 is provided between the sleeve 7 and the housing 8, but this support may also be made in one part with the housing.

The shifting device is fastened by pushing the sleeves 7 into the bushings 6 until the strap 4 becomes engaged behind the ramp 3. Complicated screw connections may be eliminated altogether.

While a specific embodiment of the invention has been shown and described in detail to illustrate the application of the principles of the invention, it will be understood that the invention may be embodied otherwise without departing from such principles.

What is claimed is:

1. A motor vehicle, comprising:
    a motor vehicle part with a bushing and a vehicle snap-in element;
    a shifting device for actuating a gear change box, said shifting device having a shifting device snap-in element which is complementary to said vehicle snap-in element, said shifting device snap-in element and said vehicle snap-in element detachably engaging one another, and said shifting device including a complementary sleeve that is complementary to said bushing and is inserted into said bushing.

2. A motor vehicle in accordance with claim 1, wherein said vehicle snap-in element comprises a ramp, said ramp being wedge-shaped when viewed in cross section and said shifting device snap-in element comprises a strap formed of a material that is spring-elastically deformable in at least an area.

3. A motor vehicle in accordance with claim 2, wherein said shifting device includes a housing formed of plastic and said strap is made in one piece with said housing.

4. A motor vehicle in accordance with claim 3, wherein the strap has an L shape when viewed in cross section, wherein said area that is spring-elastically deformable passes over into a reinforced grip area, said reinforced grip area extending at right angles to said area that is spring-elastically deformable, said grip area having a snap-in surface detachably engaging said vehicle snap-in element.

5. A motor vehicle in accordance with claim 4, wherein said snap-in surface is provided with a damping element.

6. A motor vehicle in accordance with claim 1, wherein said moter vehicle part and said shifting device include a plurality of complementary snap-in elements which position said shifting device in a predetermined position.

7. A motor vehicle in accordance with claim 2, wherein said motor vehicle part and said shifting device include a plurality of complementary bushings and sleeves.

8. A motor vehicle in accordance with claim 7, wherein said bushing have limited elasticity.

9. A motor vehicle in accordance with claim 8, wherein said bushing are approximately U-shaped or V-shaped when viewed in cross section.

10. A motor vehicle in accordance with claim 1, wherein said complementary sleeve is formed of an elastomer material or rubber or has an elastomer or rubber coating.

11. A motor vehicle shifting device connection arrangement, comprising:
    a transmission tunnel;
    a shifting device for actuating a gear change box;
    a locking device including a snap-in connection with a shifting device snap-in element and a tunnel snap-in element which is complementary to said shifting device snap-in element, said shifting device snap-in element and said tunnel snap-in element detachably engaging one another; and
    a fixing device with a bushing and a complementary sleeve that is complementary to said bushing and is inserted into said bushing, one of said bushing and complementary sleeve being joined with said tunnel and the other of said bushing and said complementary sleeve being joined with said shifting device.

12. An arrangement in accordance with claim 11, wherein said tunnel snap-in element comprises a ramp, said ramp being wedge-shaped when viewed in cross section and said shifting device snap-in element comprises a strap formed of a material that is spring-elastically deformable in at least an area.

13. An arrangement in accordance with claim 12, wherein said shifting device includes a housing formed of plastic and said strap is made in one piece with said housing.

14. An arrangement in accordance with claim 13, wherein the strap has an L shape when viewed in cross section, wherein said area that is spring-elastically deformable transitions over into a reinforced grip area, said reinforced grip area extending at right angles to said area that is spring-elastically deformable, said grip area having a snap-in surface detachably engaging said tunnel snap-in element.

15. An arrangement in accordance with claim 14, wherein said snap-in surface is provided with a damping element.

16. An arrangement in accordance with claim 11, further comprising another locking device for said shifting device, said locking device and said another locking device positioning said shifting device in a predetermined position.

17. An arrangement in accordance with claim 11, further comprising another fixing device for at said shifting device.

18. An arrangement in accordance with claim 17, wherein said bushing of said fixing device and a bushing of said another fixing device each have limited elasticity.

19. An arrangement in accordance with claim 18, wherein said bushing of said fixing device and said bushing of said another fixing device are approximately U-shaped or V-shaped when viewed in cross section.

20. An arrangement in accordance with claim 11, wherein said complementary sleeve is formed of an elastomer material or rubber or has an elastomer or rubber coating.

* * * * *